(12) United States Patent
Wang et al.

(10) Patent No.: US 12,738,743 B2
(45) Date of Patent: Sep. 15, 2026

(54) POWER FUSION SYSTEM FOR SUPPLY AND DEMAND DISPARITIES

(71) Applicant: FRANKLINWH ENERGY TECHNOLOGY INC., Santa Clara, CA (US)

(72) Inventors: Tao Wang, Shenzhen (CN); Song Chen, Shenzhen (CN); Gang Xiao, Shenzhen (CN); Daqing Wang, Shenzhen (CN)

(73) Assignee: FRANKLINWH ENERGY TECHNOLOGY INC., Santa Clara, CA (US)

( * ) Notice: Subject to any disclaimer, the term of this patent is extended or adjusted under 35 U.S.C. 154(b) by 868 days.

(21) Appl. No.: 18/112,282

(22) Filed: Feb. 21, 2023

(65) Prior Publication Data

US 2024/0283251 A1 Aug. 22, 2024

(51) Int. Cl.

| | |
|---|---|
| ***H02J 3/36*** | (2026.01) |
| ***G05B 15/02*** | (2006.01) |
| ***H02J 3/32*** | (2026.01) |

(52) U.S. Cl.

CPC ................ *H02J 3/36* (2013.01); *G05B 15/02* (2013.01); *H02J 3/32* (2013.01)

(58) Field of Classification Search

CPC ................ H02J 3/32; H02J 3/36; G05B 15/02

USPC ........................................................... 307/82

See application file for complete search history.

(56) References Cited

U.S. PATENT DOCUMENTS 11,687,112 B2 * 6/2023 Adest ........................ G05F 5/00 363/95

2021/0203165 A1 * 7/2021 Erokhovets ........... H02J 3/0075

* cited by examiner

*Primary Examiner* — Hal Kaplan

(74) *Attorney, Agent, or Firm* — Anova Law Group, PLLC

(57) ABSTRACT

A power fusion system, power supply device, and power supply system. The module comprises a control unit, at least one power conversion unit and a DC/AC unit; the power conversion unit is configured to convert current output by the power supply to DC; the DC/AC unit is connected with all installed power conversion units, and configured to convert DC output by one or more power conversion units into AC meeting power supply demand; the control unit can communicate with all installed power conversion units and DC/AC unit, and is configured to control operation of the power conversion unit and DC/AC unit. The power fusion system can convert current output by one or more power supply modules into AC meeting the demand, so as to supply power to the load corresponding to the demand and can supply power cooperatively to improve matching degree and adaptability of power supply.

29 Claims, 4 Drawing Sheets

POWER FUSION SYSTEM FOR SUPPLY AND DEMAND DISPARITIES

The present invention relates to the technical field of power supply. In particular, the invention corresponds to a power fusion system, power supply device and a power supply system.

BACKGROUND

The existing power supply system supplies power through public power supply network, but in some special circumstances (e.g., extreme weather), the power supply network is prone to failure, which results in the users unable to use electricity normally. Although the existing power supply system can provide power supply to the load, it needs a power supply matching with the load to supply power, which would lead to the problems that it is difficult to access the power supply of the household load, cannot meet the demand of long-term power reserve in extreme weather, and cannot solve the problem that multiple power supplies cooperate to supply power.

SUMMARY

The embodiment of the application provides a power fusion system, a power supply device and a power supply system, so as to solve the problem of high access difficulty caused by the fact that the power supply cannot match the power supply demand of load.

The embodiment of the application provides a power fusion system, including a control unit, at least one power conversion unit and a DC/AC unit; the power conversion unit is configured to convert current output by a power supply into DC; the DC/AC unit is coupled with all installed power conversion units, and is configured to convert DC output by one or more power conversion units into AC that meets power supply demand; the control unit communicates with all installed power conversion units and the DC/AC unit, and is configured to control operation of one or more of the power conversion units and the DC/AC unit.

The embodiment of the application provides a power supply device, including a power fusion system and a distribution box; the power fusion system is coupled to the distribution box; the power fusion system includes a control unit, at least one power conversion unit and a DC/AC unit; the power conversion unit is configured to convert current output by a power supply into DC; the DC/AC unit is coupled with all installed power conversion units, and is configured to convert DC output by one or more power conversion units into AC that meets power supply demand; the control unit communicates with all installed power conversion units and the DC/AC unit, and is configured to control operation of one or more of the power conversion units and the DC/AC unit; the distribution box is configured to determine power supply demand, and allocate one or more power supplies connected with the power fusion system to supply power to a load according to the power supply demand.

The embodiment of the application provides a power supply system, including a distribution box, a power fusion system and at least one battery module; the distribution box is coupled with the power fusion system and the battery module; the power fusion system includes a control unit, at least one power conversion unit and a DC/AC unit; the power conversion unit is configured to convert current output by a power supply into DC; the DC/AC unit is connected with all installed power conversion units, and is configured to convert DC output by one or more power conversion units into AC that meets power supply demand; the control unit communicates with all installed power conversion units and the DC/AC unit, and is configured to control operation of one or more of the power conversion units and the DC/AC unit; the distribution box is configured to determine power supply demand, and allocate the power supply connected with the power fusion system according to the power supply demand, and the battery module supplies power to the load separately or jointly.

In the above power fusion system, the power supply device and the power supply system, the power fusion system can convert the current output by the power supply into AC that meets the power supply demand to supply power to the load, so that the power supply can be matched with the load corresponding to the power supply demand, the access difficulty of the power supply can be reduced, the long-term power reserve demand in extreme weather can be met, a plurality of power supplies can supply power cooperatively, the matching degree and adaptability of different power supplies can be improved, and the power consumption experience can be improved.

BRIEF DESCRIPTION OF THE DRAWINGS

In order to illustrate the technical solutions in the embodiments of the present application or in the prior art more clearly, the following briefly introduces the accompanying drawings required for describing the embodiments or the prior art. It is obvious that the drawings in the following description only show some embodiments of the present application. A person of ordinary skill in the art can obtain other drawings according to the drawing without any creative effort.

DETAILED DESCRIPTION

In the following, the technical solutions in the embodiments of the application will be clearly and completely described with reference to the drawings. It is apparent that the described embodiments are some but not all of the embodiments of the present application. All other embodiments obtained by a person of ordinary skill in the art without any creative effort on the basis of the embodiments in the present disclosure shall fall into the scope of the present disclosure.

It is understood that the present disclosure may be embodied in many different forms and should not be construed as being limited to the embodiments set forth herein. Rather, these embodiments are provided so that this disclosure will be thorough and complete, and will fully convey the scope of the invention to those skilled in the art.

In order to make the present disclosure completely comprehensible, detailed steps and structures are provided in the following description. Preferred embodiments of the present application are described in detail below, however, besides these detailed descriptions, the present invention may involve other embodiments.

Figure 1:
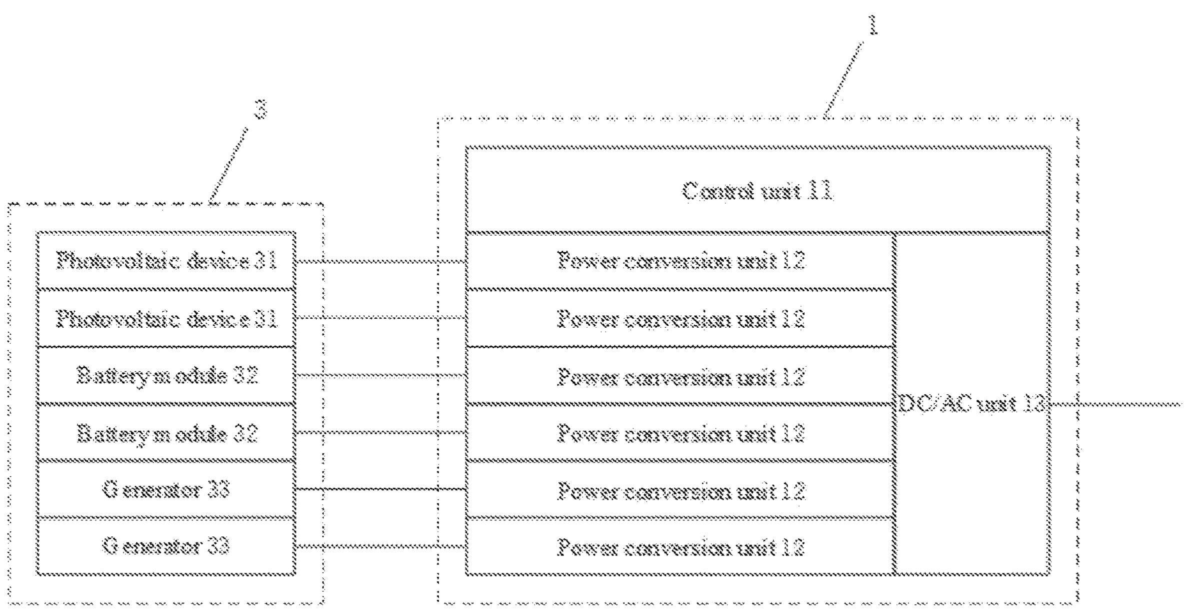
FIG. 1 is a schematic diagram of a circuit powered by a power fusion system according to an embodiment of the present application.

In an embodiment, as shown in FIG. 1, a power fusion system 1 is provided, including a control unit 11, at least one power conversion unit 12 and a DC/AC unit 13; the power conversion unit 12 is configured to convert the current output by the power supply 3 to DC; the DC/AC unit 13 is connected with all installed power conversion units 12, and is configured to convert DC output by one or more power conversion units 12 into AC that meets power supply demand; the control unit 11 communicates with all installed power conversion units 12 and DC/AC unit 13, and is configured to control operation of one or more power conversion units 12 and the DC/AC unit 13.

The control unit 11 is the unit used to realize signal control in power fusion system 1, which can realize the scheduling and coordination of the work of each module, and can perform various power protection, for example, power adjustment, proper selection of the power supply 3, and removal of faulty equipment. The power conversion unit 12 is a unit for realizing energy conversion, specifically converting the current output by the power supply 3 into DC output. The power supply 3 here includes but is not limited to a photovoltaic device 31, a battery module 32 and a generator 33. The DC/AC unit 13 is a unit for converting DC into AC.

As an example, the power fusion system 1 includes a control unit 11, a power conversion unit 12, and a DC/AC unit 13. The power conversion unit 12 can be connected to the power supply 3 to convert the current output by the power supply 3 into DC output. The DC/AC unit 13 is connected with a power conversion unit 12 and can convert the DC output from one power conversion unit 12 into AC that meets power supply demand. The DC/AC unit 13 can also be connected with the load 4 corresponding to power supply demand, so as to output the AC meeting the power supply demand to the load 4 and supply power to the load 4. The control unit 11 can communicate with an installed power conversion unit 12 and DC/AC unit 13, output control instructions to the power conversion unit 12 and DC/AC unit 13 and control the operation of the power conversion unit 12 and DC/AC unit 13.

As an example, the power fusion system 1 includes a control unit 11, a plurality of power conversion unit 12, and a DC/AC unit 13. The power conversion unit 12 can be connected to the power supply 3 to convert the current output by the power supply 3 into DC output. The DC/AC unit 13 is connected with a plurality of power conversion units 12 and can convert the DC output from the plurality of power conversion units 12 into AC that meets power supply demand. The DC/AC unit 13 may also be connected with the load 4 corresponding to the power supply demand, so as to output the AC meeting power supply demand to the load 4, which can realize that a plurality of power supplies 3 cooperate to supply power to the load 4. The control unit 11 can communicate with a plurality of installed power conversion units 12 and DC/AC unit 13, output control instructions to the power conversion unit 12 and DC/AC unit 13 and control the operation of the plurality of power conversion units 12 and DC/AC unit 13.

As an example, the power supply 3 connected to the power fusion system 1 may be a current source or a voltage source, and the power supply 3 may be dispatched to supply power to the load 4, and power adaptation can also be realized.

In this embodiment, the control unit 11 can communicate with all installed power conversion units 12 and DC/AC unit 13, and control one or more power conversion units 12 to convert the power supply 3 into DC. Then, DC/AC unit 13 is used to convert DC into AC that meets power supply demand, so that it can be matched with the load 4 corresponding to the power supply demand, which reduces access difficulty of power supply 3, meets the demand of long-term power reserve in extreme weather, enables multiple power supplies 3 to supply power cooperatively, improves the matching degree and adaptability of different power supplies 3, and improves the power consumption experience.

Figure 2:
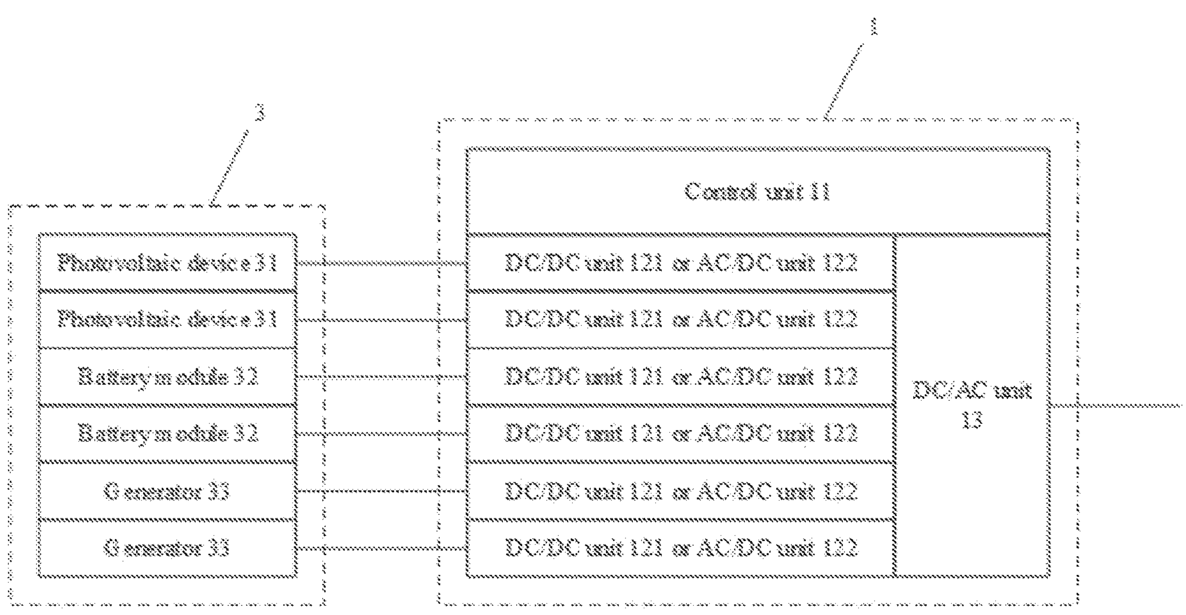
FIG. 2 is a schematic diagram of another circuit powered by a power fusion system according to an embodiment of the present application.

In an embodiment, as shown in FIG. 2, the power conversion unit 12 includes a DC/DC unit 121. The DC/DC unit 121 is configured to convert DC output from the power supply 3 into DC satisfying an input of the DC/AC unit 13.

As an example, the power conversion unit 12 can be a DC/DC unit 121, which is connected to the power supply 3, and can convert DC output from the connected power supply 3 into DC satisfying an input of the DC/AC unit 13. In this example, when the power supply 3 connected to the power fusion system 1 outputs DC (e. g., when the power supply 3 such as the photovoltaic device 31 or the battery module 32 outputs DC), the DC/DC unit 121 can convert DC output from the power supply 3 into DC that meets an output of the DC/AC unit 13, so that the DC/AC unit 13 can convert DC output from the DC/DC unit 121 into AC that meets the power supply demand to supply power to the load 4.

In an embodiment, as shown in FIG. 2, the power conversion unit 12 includes an AC/DC unit 122. The AC/DC unit 122 is configured to convert AC output by the power supply 3 into DC satisfying an input of the DC/AC unit 13.

As an example, the power conversion unit 12 may be an AC/DC unit 122, which is connected to the power supply 3, and can convert AC output from the connected power supply 3 into DC satisfying an input of the DC/AC unit 13. In this example, when the power supply 3 connected to the power fusion system 1 outputs AC (e. g., when the power supply 3 such as the generator 33, wind power, automobile V2H/V2L port outputs AC), the AC/DC unit 122 can convert AC output from the power supply 3 into DC that meets the output of the DC/AC unit 13, so that the DC/AC unit 13 can convert DC output by the AC/DC unit 122 into AC that meets the power supply demand to supply power to the load 4.

As an example, the input end of power fusion system 1 is designed in a modular way. Users can reasonably select DC/DC unit 121 or AC/DC unit 122 according to the characteristics of the power supply 3 actually connected. After determining the power conversion unit 12, according to the power supply demand, users can choose to connect one power supply 3 for power supply alone or connect multiple power supplies 3 together to supply power cooperatively, so as to ensure the output of AC meeting the power supply demand.

In an embodiment, the DC/AC unit 13 is a bidirectional DC/AC unit, and the power conversion unit 12 is a bidirectional power conversion unit. The bidirectional DC/AC unit and the bidirectional power conversion unit are configured to charge the energy storage power supply according to a charging instruction if the power supply 3 connected to the bidirectional power conversion unit is an energy storage power supply.

The bidirectional DC/AC unit is a unit that can convert DC to AC or convert AC to DC. Bidirectional power conversion unit is a unit that can realize bidirectional power conversion. The energy storage power supply refers to a power supply that can store energy, for example, the battery module 32.

As an example, when the DC/AC unit 13 is a bidirectional DC/AC unit and the power conversion unit 12 is a bidirectional power conversion unit, if the power supply 3 connected to the bidirectional power conversion unit is an energy storage power supply, that is, it has the characteristics of storing energy, the bidirectional DC/AC unit and the bidirectional power conversion unit can charge the energy storage power supply connected to the power fusion system 1 through the main electricity grid 34 or other power supply 3 according to the received charging instruction. Furthermore, the control unit 11 can also manage the energy storage power supply connected to the power fusion system 1.

In an embodiment, the control unit 11 is configured to add power supply 3 if the sum of the power output from all the power supplies 3 cannot meet power supply demand. As an example, in the process of control and allocation, the control unit 11 needs to detect whether the sum of the power output from all the power supplies 3 meets the power supply demand in real time. If it does not meet the power supply demand, it is determined that the power supplies 3 cannot supply power to all loads 4. At this time, more power supplies 3 may be added to make more power supplies 3 work together to supply power to the load 4. In this example, if the sum of the power output from all the power supplies 3 cannot meet the power supply demand, the control unit 11 can automatically start the power supply 3 connected to the power fusion system 1 but not yet started, so as to add the power supply 3 to supply power to the loads 4, ensure the normal operation of all loads 4 and improve the power consumption experience.

In an embodiment, the control unit 11 is configured to perform fault detection on all power supplies 3 in power supply, and control to disconnect the failed power supply 3.

As an example, the control unit 11 can further detect the faults of all the power supplies 3 in power supply, and if one or more power supplies 3 are detected to be faulty, it can control to disconnect the faulty power supplies 3, so that the faulty power supplies 3 would not affect the power supply of other modules, not affect the operation of the power supply system to which the power fusion system 1 belongs, and ensures the safety of electricity consumption.

In an embodiment, the control unit 11 is configured to detect the fault of the power conversion unit 12 at work and control to disconnect the failed power conversion unit 12.

As an example, the control unit 11 can further detect the faults of the power conversion units 12 at work, and if one or more power conversion units 12 are detected to have faults, the control unit 11 can control to disconnect the faulty power conversion units 12, so that the faulty power conversion unit 12 would not affect the power supply of other modules, and not affect the operation of the power supply system to which the power fusion system 1 belongs, and ensure the safety of electricity consumption.

In an embodiment, the power fusion system 1 further includes a DC bus; all installed power conversion units 12 are connected with the DC bus in parallel; the DC/AC unit 13 is connected to the DC bus.

As an example, the power fusion system 1 is provided with a DC bus, all the installed power conversion units 12 in the power fusion system 1 are connected in parallel with the DC bus, and the DC/AC unit 13 is connected with the DC bus, so that all the installed power conversion unit 12 can convert the current output by one or more power supplies 3 into DC and transmit it to the DC bus, and the DC/AC unit 13 converts the DC in the DC bus into AC output, so as to ensure the coordinated power supply of multiple power supplies 3 and improve the power consumption experience.

Figure 3:
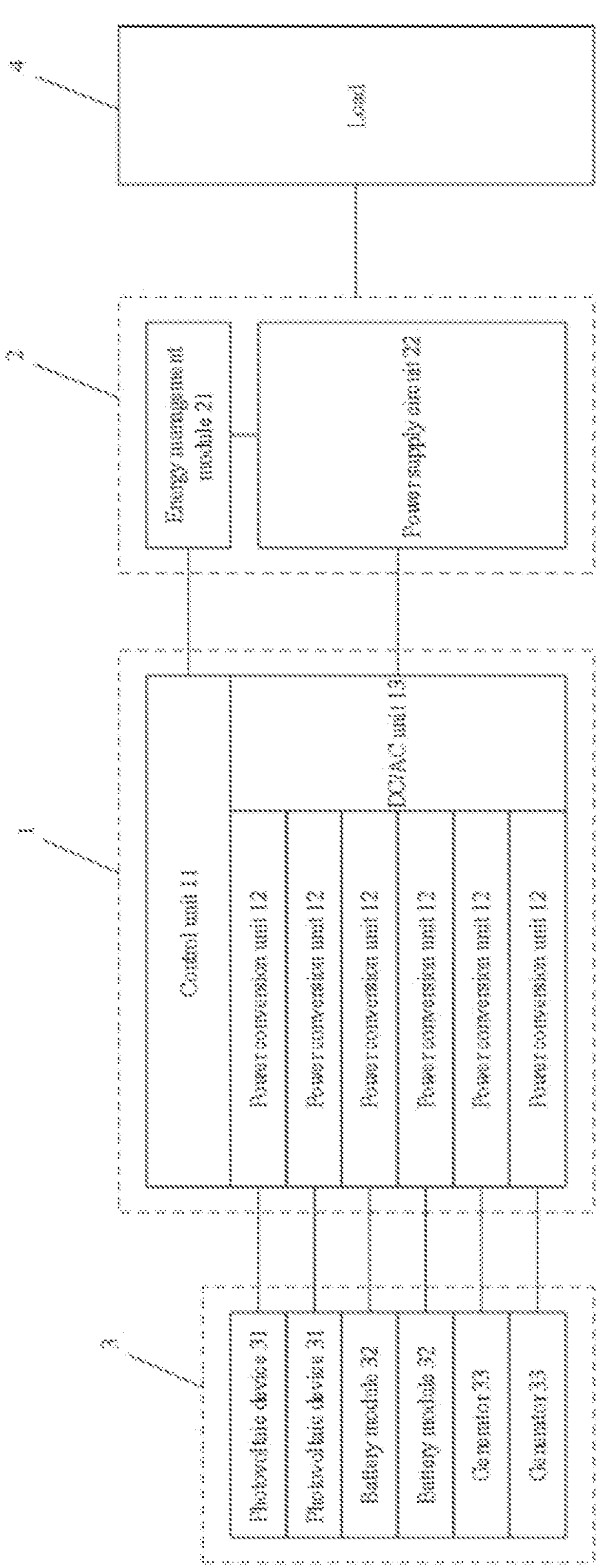
FIG. 3 is a schematic diagram of a circuit powered by a power supply device according to an embodiment of the present application.

In an embodiment, as shown in FIG. 3, a power supply device is provided, including a power fusion system 1 and a distribution box 2. Power fusion system 1 may be connected to the distribution box 2. The power fusion system 1 includes a control unit 11, at least one power conversion unit 12 and a DC/AC unit 13. The power conversion unit 12 is configured to convert the current output by the power supply 3 into DC. The DC/AC unit 13 is connected to all installed power conversion units 12 and is configured to convert DC output by one or more power conversion units 12 into AC that meets power supply demand. The control unit 11 can communicate with all the installed power conversion units 12 and DC/AC unit 13, and is configured to control the operation of one or more power conversion units 12 and DC/AC unit 13.

The distribution box 2 is configured to determine the power supply demand, and allocate one or more power supplies 3 connected to the power fusion system 1 to supply power to the load 4 according to the power supply demand.

The distribution box 2 is the energy management center, which is responsible for energy dispatching and management.

As an example, the distribution box 2 can determine power supply demand of all loads 4 according to the loads 4 connected to the distribution box 2, and allocate one or more power supplies 3 connected to the power fusion system 1 to supply power to the loads 4 according to the power supply demand. In this example, the distribution box 2 communicates with the control unit 11 in the power fusion system 1 and sends the determined power supply demand to the control unit 11, so as to enable the control unit 11 to allocate one or more power supplies 3 connected with the power fusion system 1 to supply power to the load 4, and specifically the power conversion unit 12 connected with one or more power supplies 3 is controlled to perform energy conversion on the current output by the power supplies 3 into DC, so as to convert the power supplies 3 into DC, and the DC/AC unit 13 is used for converting DC into AC that meets the power supply demand to supply power to the load 4, so that the power supplies 3 are matched with the load 4, the access difficulty of the power supplies 3 is reduced, and the long-time standby demand in extreme weather is met; and it enables a plurality of power supplies 3 to supply power cooperatively, improves the matching degree and the adaptability of different power supplies 3, and improves the power consumption experience.

In an embodiment, as shown in FIG. 3, the distribution box 2 includes an energy management module 21 and a power supply circuit 22. The input end of the power supply circuit 22 may be connected to the power fusion system 1, and the output end of the power supply circuit 22 may be connected to the load 4. The energy management module 21 can communicate with the power fusion system 1 and the power supply circuit 22, and is configured to determine the power supply demand, and allocate one or more power supplies 3 connected to the power fusion system 1 to supply power to the load 4 according to the power supply demand.

The energy management module 21 is used to realize energy management, and is responsible for energy dispatching and management. The energy management module 21 is the core of energy dispatching for the power supply device, and is responsible for the management and control of the power supply system to which the power supply device belongs, and can formulate reasonable energy dispatching management strategies according to the actual power supply demand. In this example, the energy management module 21 mainly includes a communication interface (including but not limited to CAN communication, RS485 communication, WLAN communication, Wi-Fi and 4G, etc.), relay control interface and relay detection interface functions, grid voltage detection, circuit detection, current and voltage detection of each input and output branch, and control strategy logic, etc.

The power supply circuit 22 is a circuit for realizing power supply.

As an example, the input end of the power supply circuit 22 can be connected to the power fusion system 1, and the output end of the power supply circuit 22 can be connected to the load 4. When the power supply circuit 22 is switched on, the load 4 can be powered by the AC output from the power fusion system 1 to meet the power supply demand, so as to achieve the purpose of using one or more power supplies 3 connected to the power fusion system 1 to power the load 4.

As an example, the energy management module 21 can communicate with the power fusion system 1 and the power supply circuit 22, and can determine the power supply demand of all loads 4 according to the loads 4 connected to the distribution box 2. The power supply demand is sent to the control unit 11 of the power fusion system 1, so that the control unit 11 allocates one or more power supplies 3 connected to the power fusion system 1 to supply power to the load 4, so as to control the one or more power supplies 3 to supply power to the load 4 cooperatively and improve the power consumption experience.

Figure 4:
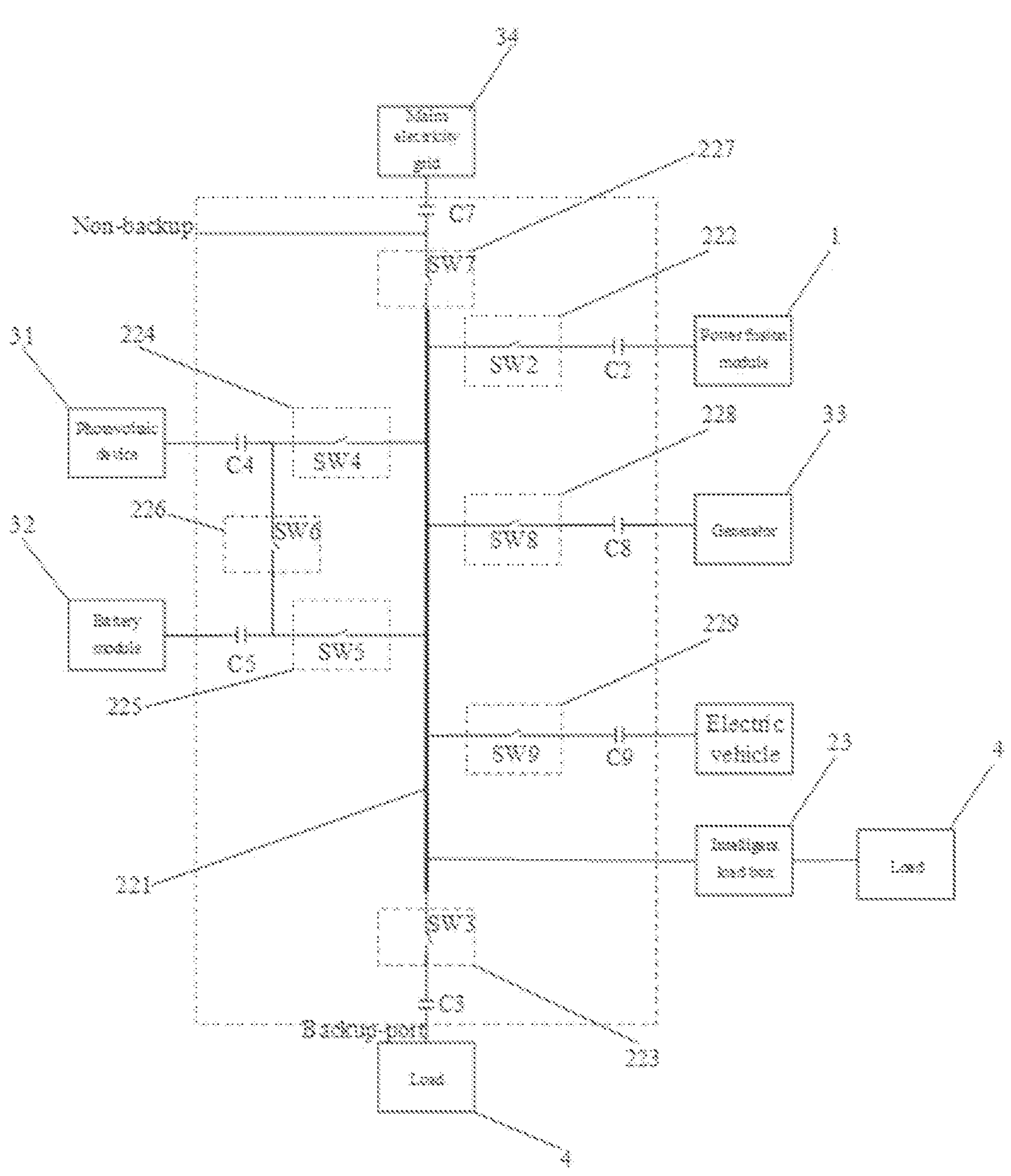
FIG. 4 is another schematic diagram of a circuit powered by a power supply device according to an embodiment of the present application.

In an embodiment, as shown in FIG. 4, the power supply circuit 22 includes a power supply bus 221 and a fusion switch circuit 222. The output end of the fusion switch circuit 222 is connected with the power supply bus 221, and the input end of the fusion switch circuit 222 can be connected with the power fusion system 1. The energy management module 21 can communicate with the fusion switch circuit 222 and is configured to control the on-off of the fusion switch circuit 222.

The power supply bus 221 is a bus arranged in the distribution box 2 for realizing power supply function. The fusion switch circuit 222 is a switch circuit for connecting the power fusion system 1.

As an example, the input end of the fusion switch circuit 222 can be connected to the power fusion system 1, and the output end of the fusion switch circuit 222 can be connected to the power supply bus 221. The energy management module 21 can communicate with the fusion switch circuit 222 and can control the on-off of the fusion switch circuit 222 according to actual demand.

In this example, the energy management module 21 can control the fusion switch circuit 222 to turn on when it needs to allocate one or more power supplies 3 connected to the power fusion system 1 to supply power to the load 4. Conversely, the energy management module 21 can control the fusion switch circuit 222 to turn off when it does not need to allocate one or more power supplies 3 connected to the power fusion system 1 to supply power to the load 4. In this example, the energy management module 21 can communicate with the power fusion system 1 to realize data exchange and power dispatching.

As shown in FIG. 4, the fusion switch circuit 222 includes a switch SW2, one end of the switch SW2 is connected to the power fusion system 1, and the other end of the switch SW2 is connected to the power supply bus 221. The energy management module 21 can control the switch SW2 to be on when the power supply 3 connected to the power fusion system 1 is needed for power supply. Conversely, the energy management module 21 can control the switch SW2 to be off when the power supply 3 connected to the power fusion system 1 is not needed for power supply. In this example, the power supply circuit 22 further includes a capacitor C2, one end of the capacitor C2 can be connected to the power fusion system 1, and the other end of the capacitor C2 can be connected to the switch SW2, so as to realize the function of DC blocking and AC passing.

In an embodiment, the energy management module 21 is configured to perform fault detection on the power fusion system 1, and control the fusion switch circuit 222 to disconnect if the power fusion system 1 has a fault.

As an example, the energy management module 21 can further perform fault detection on the power fusion system 1. When the power fusion system 1 has a fault, the fusion switch circuit 222 can be controlled to be switched off. For example, the switch SW2 shown in FIG. 4 can be controlled to be off, so that the failed power fusion system 1 would not affect the power supply of other modules, and would not affect the normal operation of the power supply system, and ensure the safety of electricity consumption.

In an embodiment, as shown in FIG. 4, the power supply circuit 22 includes a power supply bus 221 and a load switch circuit 223. The input end of the load switch circuit 223 is connected to the power supply bus 221, and the output end of the load switch circuit 223 can be connected to the load 4 with a capacitor C3 configured between the load switch circuit 223 and the load 4. The energy management module 21 can communicate with the load switch circuit 223 and is configured to control the on-off of the load switch circuit 223.

The load switch circuit 223 is a switch circuit for connecting the load 4.

As an example, the input end of the load switch circuit 223 is connected to the power supply bus 221, and the output end of the load switch circuit 223 can be connected to the load 4. The energy management module 21 can communicate with the load switch circuit 223, and control the on-off of the load switch circuit 223 according to actual needs. In this example, when it needs to supply power to one or more loads 4 connected to the distribution box 2, the load switch circuit 223 to which the one or more loads 4 belong can be controlled to be switched on to supply power to the loads 4 through the power supply bus 221. Conversely, when it does not need to supply power to one or more loads 4 connected to the distribution box 2, the load switch circuit 223 to which the one or more loads 4 belong can be controlled to be disconnected.

In an embodiment, as shown in FIG. 4, the power supply circuit 22 includes a power supply bus 221 and a photovoltaic switch circuit 224. The input end of photovoltaic switch circuit 224 is connected to a photovoltaic device 31, and the output end of photovoltaic switch circuit 224 is connected to the power supply bus 221. The energy management module 21 can communicate with the photovoltaic switch circuit 224, and is configured to control the on-off of the photovoltaic switch circuit 224.

The photovoltaic switch circuit 224 is a switch circuit for connecting the photovoltaic device 31.

As an example, the input of the photovoltaic switch circuit 224 is connected to the photovoltaic device 31, and the output of the photovoltaic switch circuit 224 is connected to the power supply bus 221. The energy management module 21 can communicate with the photovoltaic switch circuit 224, and can control the photovoltaic switch circuit 224 to be switched on according to actual demand. In this example, when it needs to connect the photovoltaic device 31 to the power supply bus 221 as the power supply 3 to supply power to the load 4 connected to the power supply bus 221 and supply power to the energy storage power supply (such as the battery module 32), the photovoltaic switch circuit 224 can be controlled to be turned on. Conversely, when it does not need to connect the photovoltaic device 31 as the power supply 3 to the power supply bus 221 to supply power to the load 4 connected to the power supply bus 221 or supply power to the energy storage power supply, the photovoltaic switch circuit 224 can be controlled to be turned off.

As shown in FIG. 4, the photovoltaic switch circuit 224 includes a switch SW4, one end of the switch SW4 is connected to the photovoltaic device 31, and the other end of the switch SW4 is connected to the power supply bus 221. When the photovoltaic device 31 needs to be connected to the distribution box 2 for power supply, the energy management module 21 can control the switch SW4 to be turned on. Conversely, when the photovoltaic device 31 does not need to be connected to the distribution box 2 for power supply, the energy management module 21 can control the switch SW4 to be turned off. In this example, the power supply circuit 22 further includes a capacitor C4. One end of the capacitor C4 can be connected to the photovoltaic device 31, and the other end of the capacitor C2 can be connected to the switch SW4, which can realize the function of DC blocking and AC passing.

In practical application, one or more photovoltaic devices 31 can be connected to the distribution box 2 through the photovoltaic switch circuit 224. For example, the currents output by a plurality of photovoltaic devices 31 may be converged and then connected to the power supply bus 221 through a photovoltaic switch circuit 224. Or, each photovoltaic device 31 can be connected to the power supply bus 221 through a photovoltaic switch circuit 224, so that the plurality of photovoltaic devices 31 can output current to the power supply bus 221 to supply power to the load 4 or the energy storage power supply connected to the distribution box 2. Understandably, after the plurality of photovoltaic device 31 are connected to the distribution box 2, the plurality of photovoltaic switch circuit 224 may be controlled separately or in groups through the energy management module 21.

In an embodiment, as shown in FIG. 4, the power supply circuit 22 includes a power supply bus 221 and a battery switch circuit 225. The input end of the battery switch circuit 225 is connected to a battery module 32, and the output end of the battery switch circuit 225 is connected to the power supply bus 221. The energy management module 21 can communicate with the battery switch circuit 225, and is configured to control the on-off of the battery switch circuit 225. The battery switch circuit 225 is a switch circuit for connecting the battery module 32.

As an example, the input of the battery switch circuit 225 is connected to the battery module 32, and the output of the battery switch circuit 225 is connected to the power supply bus 221. The energy management module 21 can communicate with the battery switch circuit 225, and can control the battery switch circuit 225 to be switched on according to actual demand. In this example, when the battery module 32 needs to be connected to the power supply bus 221 as the power supply 3 to supply power to the load 4 connected to the power supply bus 221, the battery switch circuit 225 can be controlled to be turned on. Conversely, when it does not need to connect the battery module 32 as the power supply 3 to the power supply bus 221 to supply power to the load 4 connected to the power supply bus 221, the battery switch circuit 225 can be controlled to be turned off.

As shown in FIG. 4, the battery switch circuit 225 includes a switch SW5, one end of the switch SW5 can be connected to one or more battery modules 32, and the other end of the switch SW5 is connected to the power supply bus 221. When one or more battery modules 32 need to be connected to the distribution box 2, the switch SW5 can be controlled to be turned on; when one or more battery modules 32 do not need to be connected to the distribution box 2, the switch SW5 can be controlled to be turned off. In this example, the power supply circuit 22 further includes a capacitor C5, one end of the capacitor C5 can be connected to the battery module 32, and the other end of the capacitor C5 can be connected to the switch SW5, so as to realize the function of DC blocking and AC passing.

In practical application, one or more battery modules 32 can be connected to the distribution box 2 through the battery switch circuit 225. For example, the currents output by a plurality of battery module 32 can be converged and then connected to the power supply bus 221 through a battery switch circuit 225. Or, each battery module 32 can be connected to the power supply bus 221 through a battery switch circuit 225, so that the plurality of battery modules 32 can output current to the power supply bus 221 to supply power to the load 4 connected to the distribution box 2. Understandably, after the plurality of battery modules 32 are connected to the distribution box 2, the energy management module 21 can control the operation of the plurality of battery modules 32 separately or in groups.

In an embodiment, as shown in FIG. 4, the power supply circuit 22 includes a power supply bus 221, a photovoltaic switch circuit 224, a battery switch circuit 225 and a charging start circuit 226. The input end of the photovoltaic switch circuit 224 can be connected to the photovoltaic device 31, and the output end of the photovoltaic switch circuit 224 is connected to the power supply bus 221. The input end of battery switch circuit 225 can be connected to one or more battery modules 32, and the output end of battery switch circuit 225 is connected to the power supply bus 221. The input end of the charging start circuit 226 is connected to the node between the photovoltaic switch circuit 224 and the photovoltaic device 31, and the output end of the charging start circuit 226 is connected to the node between the battery switch circuit 225 and the battery module 32. The energy management module 21 can communicate with the photovoltaic switch circuit 224, the battery switch circuit 225 and the charging start circuit 226, respectively, and is configured to, control the photovoltaic switch circuit 224 and the battery switch circuit 225 to be switched off, and control the charging start circuit 226 to be switched on, so that the photovoltaic device 31 can charge one or more battery modules 32.

The charging start circuit 226 is a switch circuit for controlling the startup of the photovoltaic device 31.

As an example, the power supply circuit 22 includes not only photovoltaic switch circuit 224 and battery switch circuit 225, but also charging start circuit 226. The input end of the photovoltaic switch circuit 224 can be connected to the photovoltaic device 31, and the output end of the photovoltaic switch circuit 224 is connected to the power supply bus 221, so that the current output by the photovoltaic device 31 can be transmitted to the power supply bus 221. The input end of the battery switch circuit 225 can be connected to one or more battery modules 32, and the output end of the battery switch circuit 225 is connected to the power supply bus 221, so that the current output by one or more battery modules 32 can be transmitted to the power supply bus 221. The input end of the charging start circuit 226 is connected to the node between the photovoltaic switch circuit 224 and the photovoltaic device 31, the output end of the charging start circuit 226 is connected to the node between the battery switch circuit 225 and the battery module 32, so that when the charging start circuit 226 is turned on, the photovoltaic device 31 can charge one or more battery modules 32.

In this example, the energy management module 21 can communicate with the photovoltaic switch circuit 224, battery switch circuit 225 and charging start circuit 226. When the photovoltaic device 31 needs to be started to supply power to one or more battery modules 32 connected to the distribution box 2, the photovoltaic switch circuit 224 and the battery switch circuit 225 can be controlled to be disconnected, the charging start circuit 226 is controlled to be turned on, so that a path is formed between the photovoltaic device 31 and one or more battery modules 32, so that the photovoltaic device 31 can charge one or more battery modules 32. Under extreme conditions, for example, when the load 4 connected to the distribution box 2 is heavy, the energy output by the photovoltaic device 31 is weak, and the main electricity grid 34 is out of power, one or more battery modules 32 cannot meet the power supply demand. In this case, the photovoltaic switch circuit 224 and the battery switch circuit 225 can be controlled to be turned off, and the charging start circuit 226 can be controlled to be turned on to start one or more battery modules 32 as voltage sources. Thus, the photovoltaic device 31 can be started, and one or more battery modules 32 can be charged under the illumination, so that the charging efficiency and energy utilization rate are improved, and the difficulty of photovoltaic start-up under extreme conditions is reduced.

As shown in FIG. 4, the photovoltaic switch circuit 224 includes a switch SW4, one end of the switch SW4 is connected to the photovoltaic device 31, and the other end of the switch SW4 is connected to the power supply bus 221. The battery switch circuit 225 includes a switch SW5, one end of the switch SW5 can be connected to one or more battery modules 32, and the other end of the switch SW5 is connected to the power supply bus 221. The power supply circuit 22 further includes a capacitor C4 arranged between the photovoltaic device 31 and the switch SW4, and a capacitor C5 arranged between the battery module 32 and the switch SW5. The charging start circuit 226 includes a switch SW6, one end of the switch SW6 is connected to the node between the capacitor C5 and the switch SW5, and the other end of the switch SW6 is connected to the node between the capacitor C4 and the switch SW5. The energy management module 21 is connected with a switch SW4, a switch SW5 and a switch SW6. When it needs to control the photovoltaic device 31 to be connected to the power supply bus 221 as the power supply 3, the switch SW4 can be controlled to be on. When it needs to control one or more battery modules 32 to be connected to the power supply bus 221 as the power supply 3, the switch SW5 can be controlled to be on. When the photovoltaic device 31 needs to be controlled to charge one or more battery modules 32, the switch SW4 and switch SW5 can be controlled to be off, and the switch SW6 can be controlled to be on, so that the battery module 32 can supply power to the photovoltaic device 31 first, thus the photovoltaic device 31 is started to work. Under the condition of illumination, the photovoltaic device 31 charges one or more battery modules 32, thereby improving the charging efficiency and energy utilization rate and reducing the difficulty of photovoltaic starting under extreme conditions.

In an embodiment, as shown in FIG. 4, the power supply circuit 22 includes a power supply bus 221 and a main switch circuit 227. The input end of the main switch circuit 227 is connected to a main electricity grid 34, and the output end of the main switch circuit 227 is connected to the power supply bus 221. The energy management module 21 can communicate with the main switch circuit 227, and is configured to control the on-off of the main switch circuit 227.

The main switch circuit 227 is a switch circuit for connecting main electricity grid 34.

As an example, the input end of main switch circuit 227 can be connected to the main electricity grid 34, and the output end of the main switch circuit 227 is connected to the power supply bus 221. The energy management module 21 can communicate with the main switch circuit 227, and control the main switch circuit 227 to be switched on according to actual demand. In this example, when it needs to connect the main electricity grid 34 as the power supply 3 to the power supply bus 221 to supply power to the load 4 connected to the power supply bus 221, the main switch circuit 227 may be controlled to be switched on. Conversely, when it does not need to connect the main electricity grid 34 as the power supply 3 to the power supply bus 221, the main switch circuit 227 can be controlled to be switched off, so as to supply power to the load 4 connected to the power supply bus 221 through other power supply 3 other than the main electricity grid 34. For example, when off-grid power is needed, the main switch circuit 227 can be controlled to be disconnected, and the power supply of main electricity grid 34 can be cut off.

As shown in FIG. 4, the main switch circuit 227 includes a switch SW7. One end of the switch SW7 can be connected to the main electricity grid 34, the other end of the switch SW7 is connected to the power supply bus 221, and the energy management module 21 communicates with the switch SW7. When the main electricity grid 34 is powered on, the switch SW7 can be controlled to be closed, so that the main electricity grid 34 is connected to the power supply bus 221 to supply power to the load 4 connected to the power supply bus 221. Alternatively, when the main electricity grid 34 is powered on, if the photovoltaic device 31 or the battery module 32 has sufficient energy to connect the power supply bus 221 and meet the power supply demand of all loads 4, the switch SW7 may also be controlled to be off to supply power to the load 4 through the photovoltaic device 31 or the battery module 32. Alternatively, when the main electricity grid 34 is powered off, the switch SW7 can be controlled to off, so as to supply power to the load 4 through the photovoltaic device 31, the battery module 32 or other power supplies 3. In this example, the power supply circuit 22 further includes a capacitor C7. One end of the capacitor C7 can be connected to the main electricity grid 34, and the other end of the capacitor C7 is connected to the switch SW7, so as to realize the function of DC blocking and AC passing.

In an embodiment, as shown in FIG. 4, the power supply circuit 22 includes a power supply bus 221, a main switch circuit 227 and a photovoltaic switch circuit 224. The input end of the main switch circuit 227 can be connected to the main electricity grid 34, and the output end of the main switch circuit 227 is connected to the power supply bus 221. The input end of the photovoltaic switch circuit 224 can be connected to the photovoltaic device 31, and the output end of the photovoltaic switch circuit 224 is connected to the power supply bus 221. The energy management module 21 can communicate with the main switch circuit 227 and the photovoltaic switch circuit 224, respectively, and is configured to, control the main switch circuit 227 and the photovoltaic switch circuit 224 to be switched on, so that the photovoltaic device 31 feeds back electric energy to the main electricity grid 34.

As an example, the input end of the main switch circuit 227 can be connected to the main electricity grid 34, and the output end of the main switch circuit 227 is connected to the power supply bus 221. The input end of photovoltaic switch circuit 224 is connected to photovoltaic device 31, and the output end of photovoltaic switch circuit 224 is connected to the power supply bus 221. The energy management module 21 communicates with the main switch circuit 227 and the photovoltaic switch circuit 224. If the main electricity grid 34 connected to the distribution box 2 can receive the electric energy feedback, the energy management module 21 can control the main switch circuit 227 and the photovoltaic switch circuit 224 to be switched on, so as to feed back the electric energy generated by the photovoltaic device 31 to the main electricity grid 34 to achieve the purpose of energy saving.

As shown in FIG. 4, the photovoltaic switch circuit 224 includes a switch SW4. One end of the switch SW4 is connected to the photovoltaic device 31, and the other end of the switch SW4 is connected to the power supply bus 221. The main switch circuit 227 includes a switch SW7, one end of the switch SW7 can be connected to main electricity grid 34, and the other end of the switch SW7 is connected to the power supply bus 221. The energy management module 21 communicates with the switch SW4 and switch SW7, and can control the switch SW4 and switch SW7 to be on when the main electricity grid 34 can receive the electric energy feedback, so that the photovoltaic device 31 can feed back the electric energy to the main electricity grid 34. The energy management module 21 is in communication with the switch SW4 and switch SW7. If the main electricity grid 34 can receive electric energy feedback, and there is still excess energy after the photovoltaic device 31 supplies power to the load 4 connected to the power supply bus 221, the switch SW4 and switch SW7 can be controlled to be on, so that the photovoltaic device 31 can feed back the excess electric energy to the main electricity grid 34.

In an embodiment, as shown in FIG. 4, the power supply circuit 22 includes a power supply bus 221, a main switch circuit 227 and a photovoltaic switch circuit 224. The input end of the main switch circuit 227 can be connected to the main electricity grid 34, and the output end of the main switch circuit 227 is connected to the power supply bus 221. The input end of the photovoltaic switch circuit 224 can be connected to the photovoltaic device 31, and the output end of the photovoltaic switch circuit 224 is connected to the power supply bus 221. The energy management module 21 can communicate with the main switch circuit 227 and photovoltaic switch circuit 224, respectively, and is configured to, detect the photovoltaic device 31, and control the main switch circuit 227 to be switched off and the photovoltaic switch circuit 224 to be switched on if the power supply capacity of the photovoltaic device 31 meets the power supply demand.

As an example, the input end of the main switch circuit 227 can be connected to the main electricity grid 34, and the output end of the main switch circuit 227 is connected to the power supply bus 221. The input end of photovoltaic switch circuit 224 is connected to photovoltaic device 31, and the output end of photovoltaic switch circuit 224 is connected to the power supply bus 221. The energy management module 21 communicates with the main switch circuit 227 and photovoltaic switch circuit 224, and can perform detection on the photovoltaic device 31 to determine power supply capacity of the photovoltaic device 31. When the power supply capacity of the photovoltaic device 31 meets the power supply demand of all loads 4, the main switch circuit 227 can be controlled to be switched off and the photovoltaic switch circuit 224 can be controlled to be switched on, so that main electricity grid 34 is not connected to the power supply bus 221 to supply power to load 4, and the photovoltaic device 31 is connected to the power supply bus 221 to supply power to load 4, so as to achieve the purpose of adopting photovoltaic device 31, a green power supply, to achieve energy conservation and environmental protection.

As shown in FIG. 4, the photovoltaic switch circuit 224 includes a switch SW4. One end of the switch SW4 is connected to the photovoltaic device 31, and the other end of the switch SW4 is connected to the power supply bus 221. The main switch circuit 227 includes a switch SW7, one end of the switch SW7 can be connected to main electricity grid 34, and the other end of the switch SW7 is connected to the power supply bus 221. The energy management module 21 communicates with the switch SW4 and switch SW7. When it is detected that the power supply capacity of the photovoltaic device 31 meets the power supply demand of all loads 4, it can control the switch SW7 to be off, and control the switch SW4 to be on, so as to turn off the main electricity grid 34, and use the photovoltaic device 31 to supply power to the load 4, so that the purposes of energy conservation and environmental protection are achieved.

In an embodiment, as shown in FIG. 4, the power supply circuit 22 includes a power supply bus 221, a main switch circuit 227 and a battery switch circuit 225. The input end of the main switch circuit 227 can be connected to the main electricity grid 34, and the output end of the main switch circuit 227 is connected to the power supply bus 221. The input end of the battery switch circuit 225 can be connected to one or more battery modules 32, and the output end of the battery switch circuit 225 is connected to the power supply bus 221. The energy management module 21 can communicate with the main switch circuit 227 and battery switch circuit 225, respectively, and is configured to, detect the battery module 32, and control the main switch circuit 227 to be switched off and the battery switch circuit 225 to be switched on if the power supply capacity of the battery module 32 meets the power supply demand.

As an example, the input end of the main switch circuit 227 can be connected to the main electricity grid 34, and the output end of the main switch circuit 227 is connected to the power supply bus 221, so as to supply power to the load 4 through the main electricity grid 34. The input end of battery switch circuit 225 can be connected to one or more battery modules 32, and the output end of battery switch circuit 225 is connected to the power supply bus 221. The energy management module 21 communicates with the main switch circuit 227 and the battery switch circuit 225. The energy management module 21 can detect one or more battery modules 32 to determine the power supply capacity of one or more battery modules 32. When the power supply capacity of the battery module 32 meets the power supply demand of all loads 4, the main switch circuit 227 can be controlled to be switched off and the battery switch circuit 225 can be controlled to be switched on, so that the main electricity grid 34 is not connected to the power supply bus 221 to supply power to the load 4, and the one or more battery modules 32 are connected to the power supply bus 221 to supply power to the load 4, so that the battery module 32, a green power supply, can be used to supply power, and the purposes of energy conservation and environmental protection can be achieved.

As shown in FIG. 4, the battery switch circuit 225 includes a switch SW5. One end of the switch SW5 is connected to one or more battery modules 32, and the other end of the switch SW5 is connected to the power supply bus 221. The main switch circuit 227 includes a switch SW7, one end of the switch SW7 can be connected to main electricity grid 34, and the other end of the switch SW7 is connected to the power supply bus 221. The energy management module 21 can communicate with the switch SW5 and switch SW7. When it is detected that the power supply capacity of the battery module 32 meets the power supply demand of all loads 4, it can control the switch SW7 to be off, and control the switch SW5 to be on, so as to turn off the main electricity grid 34, and use the battery module 32 to supply power to the load 4, so that the purposes of energy conservation and environmental protection are achieved.

In an embodiment, as shown in FIG. 4, the power supply circuit 22 includes a power supply bus 221, a main switch circuit 227, a photovoltaic switch circuit 224 and a battery switch circuit 225. The input end of main switch circuit 227 can be connected to the main electricity grid 34, and the output end of main switch circuit 227 is connected to the power supply bus 221. The input end of the photovoltaic switch circuit 224 can be connected to the photovoltaic device 31, and the output end of the photovoltaic switch circuit 224 is connected to the power supply bus 221. The input end of battery switch circuit 225 can be connected to one or more battery modules 32, and the output end of the battery switch circuit 225 is connected to the power supply bus 221. The energy management module 21 can communicate with the main switch circuit 227, the photovoltaic switch circuit 224 and the battery switch circuit 225, respectively, and is configured to, detect the photovoltaic device 31 and battery module 32, and if the sum of the power supply capacities of the photovoltaic device 31 and battery module 32 meets the power supply demand, control the main switch circuit 227 to be switched off, the photovoltaic switch circuit 224 to be switched on and the battery switch circuit 225 to be switched on.

As an example, the input end of the main switch circuit 227 can be connected to the main electricity grid 34, and the output end of the main switch circuit 227 is connected to the power supply bus 221. The input end of photovoltaic switch circuit 224 is connected to photovoltaic device 31, and the output end of photovoltaic switch circuit 224 is connected to power supply bus 221. The input end of battery switch circuit 225 can be connected to one or more battery modules 32, and the output end of battery switch circuit 225 is connected to power supply bus 221. The energy management module 21 communicates with the main switch circuit 227, photovoltaic switch circuit 224 and battery switch circuit 225, the energy management module 21 can detect the photovoltaic device 31 and battery module 32 to determine the power supply capacity of the photovoltaic device 31 and battery module 32. When the sum of the power supply capacity of the photovoltaic device 31 and the power supply capacity of the battery module 32 meets the power supply demand of all loads 4, the main switch circuit 227 can be controlled to be switched off, the photovoltaic switch circuit 224 can be controlled to be switched on, and the battery module 32 can be controlled to be switched on, so that the main electricity grid 34 is not connected to power supply bus 221 to supply power to the load 4, but the photovoltaic device 31 and battery module 32 are connected to the power supply bus 221 to supply power to the load 4, so as to achieve the purpose of energy saving and environmental protection by using green power sources such as photovoltaic device 31 and battery module 32.

As shown in FIG. 4, the photovoltaic switch circuit 224 includes a switch SW4, one end of the switch SW4 is connected to the photovoltaic device 31, and the other end of the switch SW4 is connected to the power supply bus 221. The battery switch circuit 225 includes a switch SW5, one end of the switch SW5 can be connected to one or more battery modules 32, and the other end of the switch SW5 is connected to the power supply bus 221. The main switch circuit 227 includes a switch SW7, one end of the switch SW7 can be connected to the main electricity grid 34, and the other end of the switch SW7 is connected to the power supply bus 221. The energy management module 21 communicates with the switch SW4, switch SW5 and switch SW7. When it is detected that the sum of the power supply capacity of the photovoltaic device 31 and the power supply capacity of the battery module 32 meets the power supply demand of all loads 4, the switch SW7 can be controlled to be off, and the switch SW4 and switch SW5 can be controlled to be on, so as to disconnect the main electricity grid 34, and use the photovoltaic device 31 and battery module 32 to supply power to the load 4, thus achieving the purpose of energy saving and environmental protection.

In an embodiment, as shown in FIG. 4, the power supply circuit 22 includes a power supply bus 221 and a generator switch circuit 228. The input end of the generator switch circuit 228 can be connected to a generator 33, and the output end of the generator switch circuit 228 is connected to the power supply bus 221. The energy management module 21 can communicate with the generator switch circuit 228, and is configured to control the on-off of the generator switch circuit 228.

The generator switch circuit 228 is a switch circuit for connecting the generator 33.

As an example, the input end of the generator switch circuit 228 can be connected to the generator 33, and the output end of the generator switch circuit 228 is connected to the power supply bus 221, so as to switch the generator 33 to output electric energy to the power supply bus 221. The energy management module 21 can communicate with the generator switch circuit 228, and can control the on-off of the generator switch circuit 228 according to actual demand. In this example, when it needs to connect the generator 33 to the power supply bus 221 as the power supply 3 to supply power to the load 4 connected to the power supply bus 221 and supply power to the energy storage power supply (such as the battery module 32), the generator switch circuit 228 can be controlled to be switched on. Conversely, when it does not need to connect the generator 33 as the power supply 3 to the power supply bus 221 to supply power to the load 4 connected to the power supply bus 221 or supply power to the energy storage power supply, the generator switch circuit 228 can be controlled to be switched off.

As shown in FIG. 4, the generator switch circuit 228 includes a switch SW5. One end of the switch SW8 is connected to the generator 33, and the other end of the switch SW8 is connected to the power supply bus 221. When it needs to connect the generator 33 to the power supply bus 221 for power supply, the energy management module 21 can control the switch SW8 to be on. Conversely, when it does not need to connect the generator 33 to the power supply bus 221 for power supply, the energy management module 21 can control the switch SW8 to be off. In this example, the power supply circuit 22 further includes a capacitor C8, one end of the capacitor C8 can be connected to the generator 33, and the other end of the capacitor C8 can be connected to the switch SW4, so as to realize the function of DC blocking and AC passing.

In an embodiment, the energy management module 21 can communicate with the generator 33, and is configured to control the start and stop of the generator 33.

As an example, the energy management module 21 can also communicate with the generator 33, and when it needs to use the generator 33 as the power supply 3 to connect the power supply bus 221, the generator switch circuit 228 can be controlled to be switched on, and the generator 33 is controlled to start, so that the electric energy generated during working process of the generator 33 is transmitted to the power supply bus 221 through the generator switch circuit 228, thereby supplying power to the load 4 connected to the power supply bus 221 or the energy storage power source (such as the battery module 32). Conversely, when it does not need to use the generator 33 as the power supply 3 to connect the power supply bus 221, the generator switch circuit 228 can be controlled to be switched off, and the generator 33 can be controlled to stop working.

In an embodiment, as shown in FIG. 4, the power supply circuit 22 includes a power supply bus 221, a generator switch circuit 228 and a battery switch circuit 225. The input end of the generator switch circuit 228 can be connected to the generator 33, and the output end of the generator switch circuit 228 is connected to the power supply bus 221. The input end of battery switch circuit 225 can be connected to one or more battery modules 32, and the output end of battery switch circuit 225 is connected to power supply bus 221. The energy management module 21 can communicate with the generator switch circuit 228 and battery switch circuit 225 respectively and is configured to control the generator switch circuit 228 and battery switch circuit 225 to be switched on, so that the generator 33 can charge the battery module 32.

As an example, the input end of the generator switch circuit 228 can be connected to the generator 33, and the output end of the generator switch circuit 228 is connected to the power supply bus 221, so as to enable the generator 33 to output electric energy to the power supply bus 221. The input end of the battery switch circuit 225 can be connected with one or more battery modules 32, and the output end of the battery switch circuit 225 is connected with the power supply bus 221, so that the battery modules 32 can output power to the power supply bus 221 or receive power from the power supply bus 221. The energy management module 21 can communicate with the generator switch circuit 228 and battery switch circuit 225 respectively. When it needs to start the generator 33 to supply power to one or more battery modules 32 connected to the distribution box 2, the generator switch circuit 228 and the battery switch circuit 225 can be controlled to be switched on, so that the generator 33 can supply power to the one or more battery modules 32.

As shown in FIG. 4, the generator switch circuit 228 includes a switch SW8, one end of the switch SW8 is connected to the generator 33, and the other end of the switch SW8 is connected to the power supply bus 221. The battery switch circuit 225 includes a switch SW5, one end of the switch SW5 can be connected to one or more battery modules 32, and the other end of the switch SW5 is connected to the power supply bus 221. The energy management module 21 communicates with the switch SW5 and switch SW5, and can control the switch SW5 and switch SW8 to be on, so that the generator 33 can supply power to one or more battery modules 32.

In an embodiment, as shown in FIG. 4, the power supply circuit 22 includes a power supply bus 221, a generator switch circuit 228 and a load switch circuit 223. The input end of the generator switch circuit 228 can be connected to the generator 33, and the output end of the generator switch circuit 228 is connected to the power supply bus 221. The input end of the load switch circuit 223 is connected to the power supply bus 221, and the output end of the load switch circuit 223 can be connected to the load 4. The energy management module 21 can communicate with the generator switch circuit 228 and load switch circuit 223 respectively, and is configured to, control the generator switch circuit 228 and load switch circuit 223 to be switched on, so that the generator 33 can supply power to the load 4.

As an example, the input end of the generator switch circuit 228 can be connected to the generator 33, and the output end of the generator switch circuit 228 is connected to the power supply bus 221, so as to enable the generator 33 to output electric energy to the power supply bus 221. The input end of the load switch circuit 223 is connected to the power supply bus 221, and the output end of the load switch circuit 223 can be connected to the load 4, so that the load 4 can receive electric energy from the power supply bus 221. The energy management module 21 can communicate with the generator switch circuit 228 and load switch circuit 223 respectively. When it needs to start the generator 33 to supply power to the load 4 connected to the distribution box 2, the generator switch circuit 228 and load switch circuit 223 can be controlled to be switched on, so that the generator 33 can supply power to one or more loads 4.

As shown in FIG. 4, the generator switch circuit 228 includes a switch SW8, one end of the switch SW8 is connected to the generator 33, and the other end of the switch SW8 is connected to the power supply bus 221. The load switch circuit 223 includes a switch SW3, one end of the switch SW3 can be connected to one or more loads 4, and the other end of the switch SW3 is connected to the power supply bus 221. The energy management module 21 communicates with the switch SW5 and switch SW5, and can control the switch SW5 and switch SW8 to be on, so that the generator 33 can supply power to one or more loads 4.

In an embodiment, as shown in FIG. 4, the power supply circuit 22 includes a power supply bus 221, a main switch circuit 227, a standby switch circuit and a standby load branch. The input end of main switch circuit 227 can be connected to the main electricity grid 34, and the output end of the main switch circuit 227 is connected to the power supply bus 221. The input end of the standby switch circuit can be connected with a standby power supply, and the output end of the standby switch circuit is connected with the power supply bus 221. The input end of the standby load branch is connected with the power supply bus 221, and the output end of the standby load branch can be connected with a standby load. The energy management module 21 can communicate with the main switch circuit 227, standby switch circuit and standby load branch respectively, and is configured to, control the main switch circuit 227 to be switched off, and the standby switch circuit and standby load branch to be switched on, so that the standby power supply can supply power to the standby load.

The standby power supply refers to the power supply other than the main electricity grid 34. The standby switch circuit is used to connect the standby power supply. For example, when the standby power supply is photovoltaic device 31, the standby switch circuit is photovoltaic switch circuit 224. For another example, when the standby power supply is battery module 32, the standby switch circuit is battery switch circuit 225; For another example, when the standby power supply is generator 33, the standby switch circuit is generator switch circuit 228. The standby load branch refers to: the branch on which the load 4 powered by the standby power supply is located may be used when the main electricity grid 34 is disconnected. The standby load refers to the load 4 powered by the standby power supply.

As an example, the input end of the main switch circuit 227 can be connected to the main electricity grid 34, and the output end of the main switch circuit 227 is connected to the power supply bus 221, so as to supply power to the load 4 by the main electricity grid 34. The input end of the standby switch circuit can be connected with the standby power supply, and the output end of the standby switch circuit is connected with the power supply bus 221 to supply power to the load 4 through the standby power supply. The input end of the standby load branch is connected to the power supply bus 221, and the output end of the standby load branch can be connected to the standby load, and power can be supplied to the standby load through the power supply bus 221. The energy management module 21 can communicate with the main switch circuit 227, standby switch circuit and standby load branch respectively, and control the main switch circuit 227 to be switched off, and the standby switch circuit and standby load branch to be switched on, so as to enable the standby power supply to supply power to the standby load after the main electricity grid 34 is powered off.

As shown in FIG. 4, there is a standby load branch in the power supply circuit 22, the input end of the standby load branch is connected to the power supply bus 221, and the output end of the standby load branch is a Backup-port, which can be used to connect the standby load. After the main electricity grid 34 loses power, the main switch circuit 227 can be controlled to be disconnected, so that the main electricity grid 34 does not supply power to the standby load branch. Accordingly, the standby switch circuit and standby load branch can be controlled to be switched on, so that the standby power supply such as photovoltaic device 31, battery module 32 and generator 33 can supply power to the standby load.

In an embodiment, the power supply circuit 22 includes a power supply bus 221, a main switch circuit 227 and a non-standby load branch. The input end of the main switch circuit 227 can be connected to the main electricity grid 34, and the output end of the main switch circuit 227 is connected to the power supply bus 221. The input end of the non-standby load branch is connected with the power supply bus 221, and the output end of the non-standby load branch can be connected with the non-standby load. The energy management module 21 can communicate with the main switch circuit 227 and the non-standby load branch respectively, and is configured to, control the non-standby load branch to be turned on if the main switch circuit 227 is on; control the non-standby load branch to be turned off if the main switch circuit 227 is off.

The standby power supply refers to the power supply other than the main electricity grid 34. The standby switch circuit is used to connect the standby power supply. The non-standby load branch refers to: the branch on which the load 4 powered by the standby power supply is located cannot be used when the main electricity grid 34 is disconnected. The standby load refers to the load 4 powered by the standby power supply.

As an example, the input end of the main switch circuit 227 can be connected to the main electricity grid 34, and the output end of the main switch circuit 227 is connected to the power supply bus 221, so as to supply power to the load 4 by the main electricity grid 34. The input end of the non-standby load branch is connected to the power supply bus 221, and the output end of the non-standby load branch can be connected to the non-standby load, and power can be supplied to the non-standby load through the power supply bus 221. The energy management module 21 can communicate with the main switch circuit 227 and non-standby load branch respectively. If the main switch circuit 227 is on, the non-standby load branch is controlled to be turned on, so that the main electricity grid 34 can supply power to the non-standby load. If the main switch circuit 227 is off, the non-standby load branch is controlled to be turned off, so that the non-standby load is powered off after the main electricity grid 34 is powered off.

As shown in FIG. 4, the power supply circuit 22 is provided with a non-standby load branch, and the input end of the non-standby load branch is connected with the power supply bus 221. The output end of the standby load branch is a Non-backup port, which can be used to connect the non-standby load. When the main switch circuit 227 is on, the main electricity grid 34 can be controlled to supply power to the non-standby load. When main switch circuit 227 is disconnected, the non-standby load branch is controlled to be disconnected without using the standby power supply to supply power to the non-standby load.

In practical application, according to the needs of users, some loads 4 may be connected to the Backup-port, which is determined as standby load, and some loads 4 may be connected to the Non-backup port, which is determined as non-standby load. For example, when the distribution box 2 is for applicable power to the household load 4. The important load 4 that needs standby power can be connected to the Backup-port and determined as the standby load.

In an embodiment, as shown in FIG. 4, the power supply circuit 22 includes a power supply bus 221 and an electric vehicle charging circuit 229. The input end of the electric vehicle charging circuit 229 is connected with the power supply bus 221, and the output end of the electric vehicle charging circuit 229 is connected with an electric vehicle. The energy management module 21 communicates with the electric vehicle charging circuit 229, and is configured to control the on-off of the electric vehicle charging circuit 229.

The electric vehicle charging circuit 229 is a switch circuit for connecting electric vehicles.

As an example, the input end of the electric vehicle charging circuit 229 is connected to the power supply bus 221, and the output end of the electric vehicle charging circuit 229 is connected to the electric vehicle, so as to determine whether to output the electric energy of the power supply bus 221 to the electric vehicle. The energy management module 21 can communicate with the electric vehicle charging circuit 229. When the electric vehicle needs to be charged, the electric vehicle charging circuit 229 can be controlled to be switched on, so that one or more power supplies 3 connected to the distribution box 2 can supply power to the electric vehicle. When the electric vehicle does not need to be charged, the electric vehicle charging circuit 229 can be controlled to be switched off.

As shown in FIG. 4, the electric vehicle charging circuit 229 includes a switch SW9. One end of the switch SW9 is connected to an electric vehicle, and the other end of the switch SW9 is connected to the power supply bus 221. When the electric vehicle needs to be charged, the energy management module 21 can control the switch SW9 to be on. Conversely, when the electric vehicle does not need to be charged, the energy management module 21 can control the switch SW9 to be off. In this example, the power supply circuit 22 also includes a capacitor C9. One end of the capacitor C9 can be connected to the electric vehicle, and the other end of the capacitor C9 can be connected to a switch SW9, so as to realize the function of DC blocking and AC passing.

In an embodiment, as shown in FIG. 4, the power supply device further includes an intelligent load box 23. The input end of the intelligent load box 23 is connected to the distribution box 2, and the output end of the intelligent load box 23 can be connected to the load 4. And the intelligent load box 23 is configured to control power supply of the load 4. The intelligent load box 23 is a device for controlling the load 4.

As an example, the power supply device further includes an intelligent load box 23. The input end of the intelligent load box 23 is connected to the distribution box 2, and the output end of the intelligent load box 23 can be connected to the load 4, so as to supply power to the load 4 connected to the intelligent load box 23 through the distribution box 2. In this example, the load 4 connected to the intelligent load box 23 may be the load 4 that needs to be controlled in the home or the load 4 that needs to be controlled remotely. For example, the intelligent load box 23 can be connected with an air conditioner. When the air conditioner is in use, it can be controlled to turn on by remote control or APP, and then electric energy output by the distribution box 2 can be used to supply power to the air conditioner through the intelligent load box 23. For another example, when the main electricity grid 34 is powered off and the power capacity supplied by the standby power supply is low, the load 4 connected to the intelligent load box 23 can be controlled to lose power through remote control or APP to ensure the continuous power supply of other standby loads.

As an example, the intelligent load box 23 can be connected to an electric vehicle or other loads 4 that need to be charged. When such loads 4 need to be charged are connected, the charging information can be set independently. For example, the charging can be set regularly, the charging amount can be monitored and the charging duration can be selected independently to meet various charging requirements.

As an example, the intelligent load box 23 can receive other standby power supplies except the main electricity grid 34. For example, it can receive AC sources such as generator 33 and the V2L port of electric vehicle, so as to reserve power for the household load 4 in an emergency and realize flexible multi-source access.

Understandably, the power supply device can be composed of switch circuits corresponding to one or more connection functions in the above-mentioned embodiments, switch circuits corresponding to one or more connection functions, and power supply 3 or load 4 connected to the switch circuits, so as to form a power supply system. Each switch circuit includes an idle switch and a relay. According to the actual situation, it can be determined whether there is only an idle switch or only a relay to meet different requirements.

In an embodiment, a power supply system is provided, including a distribution box 2, a power fusion system 1 and at least one battery module 32. The distribution box 2 is connected with the power fusion system 1 and battery module 32. The power fusion system 1 includes a control unit 11, at least one power conversion unit 12 and a DC/AC unit 13. The power conversion unit 12 is configured to convert the current output by the power supply 3 into DC. The DC/AC unit 13 is connected to all installed power conversion units 12, and is configured to convert DC output by one or more power conversion units 12 into AC to meet power supply demand. The control unit 11 communicates with all installed power conversion units 12 and DC/AC unit 13, and is configured to control the operation of one or more power conversion units 12 and DC/AC unit 13. The distribution box 2 is configured to determine power supply demand, and allocate the power supply 3 connected to the power fusion system 1 and the battery module 32 to supply power to the load 4 separately or jointly according to the power supply demand.

As an example, the power supply system includes a distribution box 2, a power fusion system 1 connected to the distribution box 2 and at least one battery module 32. The power fusion system 1 includes a control unit 11, at least one power conversion unit 12 communicating with the control unit 11, and a DC/AC unit 13. The power conversion unit 12 can convert the current output by one or more power supplies 3 into the DC required by the DC/AC unit 13, and then the DC/AC unit 13 converts the DC into the AC meeting the power supply demand to supply power to the load 4. In this example, the distribution box 2 can determine the power supply demand of all the loads 4 according to the loads 4 connected to the distribution box 2, and can allocate one or more power supplies 3 connected to the power fusion system 1 to supply power to the loads 4 independently according to the power supply demand, or allocate one or more battery modules 32 connected to the distribution box 2 to supply power to the load 4, or allocate the power supply 3 and battery modules 32 to jointly supply power to the load 4.

As an example, the power supply system can be applied to the case of supplying power to household load 4, including one or more power supplies 3 and distribution box 2. That is, one or more of the power supplies 3, such as main electricity grid 34, photovoltaic device 31, battery module 32 and generator 33, can be connected to the distribution box 2, and the connected load 4 is supplied with power through the distribution box 2.

As an example, the power supply system can be applied to the case of supplying power to household load 4, including one or more power supplies 3, power fusion system 1 and distribution box 2. That is, one or more of the power supplies 3, such as main electricity grid 34, photovoltaic device 31, battery module 32 and generator 33, can be connected to the power fusion system 1, and then the power fusion system 1 is connected to the distribution box 2 to supply power to the connected load 4 through the distribution box 2.

As an example, in the power supply system, the uncontrollable power supply 3 can be connected to the power fusion system 1 according to the power supply demand, and after passing through the power fusion system 1, the currents output by various power supplies 3 can be converted into AC that meets the power supply demand, so as to convert the uncontrollable power supply 3 into a controllable power supply 3 that can be managed and dispatched to supply power to the household load 4.

As an example, the power supply system may include a distribution box 2, a distribution box 2 and a power fusion system 1 and may further include a distribution box 2 and a battery module 32. Then the distribution box 2 may be connected to one or more external devices, for example, one or more loads 4.

As an example, in the power supply system, the distribution box 2 is an energy management center, which is used to realize the connection and management of the power supply 3, and the connection and management of the load 4.

As an example, in the power supply system, the distribution box 2 can support the connection of main electricity grid 34, photovoltaic device 31, battery module 32, generator 33, electric vehicle, intelligent load box 23 and power fusion system 1, and it can be composed of partial connection of the above or more power supplies 3.

As an example, in the power supply system, the distribution box 2 is internally provided with an energy management module 21, which has functions of communication (wired communication and wireless communication), other source access control, fault detection and energy coordination, etc.

As an example, in the power supply system, the distribution box 2 can not only support the direct access of one or more power supplies 3, but also support the indirect access of one or more power supplies 3. For example, the indirect access through the power fusion system 1 or the regulated access through other inverters. Understandably, the combination of the distribution box 2 and power fusion system 1 can ensure the flexibility of the power supply system to access the power supply 3.

As an example, in the power supply system, the distribution box 2 can realize the active off-grid function, that is, it can be set by the user independently, and the main electricity grid 34 can be actively disconnected from the power supply system, and other power supplies 3 can be used to form a home microgrid. For example, the home microgrid is composed of a photovoltaic device 31, battery module 32, generator 33 and power fusion system 1, and the power supply 3 in the home microgrid can be used for power supply alone or jointly.

The above embodiments are only used to illustrate the technical solutions of the present application, but not to limit it. Although the present application has been described in detail with reference to the foregoing embodiments, those skilled in the art would understand that it is possible to modify the technical solutions described in the foregoing embodiments, or to replace some technical features with equivalents. However, these modifications or substitutions do not make the essence of the corresponding technical solutions deviate from the spirit and scope of the technical solutions of various embodiments of the present application, and shall be included in the protection scope of the present application. Further, unless otherwise required by context, singular terms shall include pluralities and plural terms shall include the singular.

The invention claimed is:

1. A power fusion system comprising:

a control unit, at least one power conversion unit, and a DC/AC unit, wherein the power conversion unit is configured to convert current output by at least one power supply into DC;

the DC/AC unit coupled to all of the at least one power conversion unit, and is configured to convert DC output by the at least one power conversion unit into AC that meets power supply demand; and the control unit communicates with all of the at least one power conversion unit and the DC/AC unit and is configured to control operation of the at least one power conversion unit and the DC/AC unit, wherein the DC/AC unit is a bidirectional DC/AC unit, the at least one power conversion unit is a bidirectional power conversion unit; and the bidirectional power conversion unit is configured to charge an energy storage power supply according to a charging instruction if the at least one power supply coupled to the bidirectional power conversion unit is the energy storage power supply.

2. The power fusion system of claim 1, wherein the at least one power conversion unit comprises a DC/DC unit; and the DC/DC unit is configured to convert a DC output by the at least one power supply into DC satisfying an input requirement of the DC/AC unit.

3. The power fusion system of claim 1, wherein the at least one power conversion unit further comprises an AC/DC unit;

the AC/DC unit is configured to convert an AC output by the at least one power supply into DC satisfying an input requirement of the DC/AC unit.

4. The power fusion system of claim 1, wherein the control unit is further configured to increase power supply if the sum of power output by all power supplies in the at least one power supply cannot meet the power supply demand.

5. The power fusion system of claim 1, wherein the control unit is further configured to perform a fault detection on all power supplies in the at least one power supply and disconnect any failed power supplies.

6. The power fusion system of claim 5, wherein the control unit is further configured to perform the fault detection on the power conversion unit and disconnect any failed power conversion unit.

7. The power fusion system of claim 1, wherein the system further comprises a DC bus; wherein all of the at least one power conversion units are connected in parallel with the DC bus; and the DC/AC unit is connected with the DC bus.

8. A power supply device, comprising a power fusion system and a distribution box;

the power fusion system coupled to the distribution box; and the power fusion system comprising a control unit, at least one power conversion unit, and a DC/AC unit, wherein the power conversion unit is configured to convert current output by at least one power supply into DC;

the DC/AC is unit coupled to all of the at least one power conversion unit, and is configured to convert DC output by the at least one power conversion unit into AC that meets a power supply demand;

the control unit communicates with all of the at least one power conversion unit and the DC/AC unit and is configured to control operation of the at least one power conversion units and the DC/AC unit; and the distribution box is configured to determine the power supply demand and allocate the at least one power supply coupled with the power fusion system to supply power to a load according to the power supply demand.

9. The power supply device of claim 8, wherein the distribution box comprises an energy management module and a power supply circuit;

wherein an input end of the power supply circuit is coupled with the power fusion system, and an output end of the power supply circuit coupled with the load; and the energy management module communicates with the power fusion system and the power supply circuit, and is configured to determine the power supply demand, and allocate the at least one power supply coupled with the power fusion system to supply power to the load according to the power supply demand.

10. The power supply device of claim 9, wherein the power supply circuit comprises a power supply bus and a fusion switch circuit;

wherein an output end of the fusion switch circuit is coupled with the power supply bus, and an input end of the fusion switch circuit is coupled with the power fusion system; and the energy management module communicates with the fusion switch circuit and is configured to control on-off functionality of the fusion switch circuit.

11. The power supply device of claim 9, wherein the energy management module is configured to perform a fault detection on the power fusion system and disconnect the fusion switch circuit if the power fusion system has a fault.

12. The power supply device of claim 9, wherein the power supply circuit comprises a power supply bus and a load switch circuit;

wherein an input end of the load switch circuit is coupled with the power supply bus, and an output end of the load switch circuit is coupled with a load; and the energy management module communicates with the load switch circuit and is configured to control on-off functionality of the load switch circuit.

13. The power supply device of claim 9, wherein the power supply circuit comprises a power supply bus and a photovoltaic switch circuit;

wherein an input end of the photovoltaic switch circuit is coupled with a photovoltaic device, and an output end of the photovoltaic switch circuit is coupled with the power supply bus; and the energy management module communicates with the photovoltaic switch circuit and is configured to control on-off functionality of the photovoltaic switch circuit.

14. The power supply device of claim 9, wherein the power supply circuit comprises a power supply bus and a battery switch circuit;

wherein an input end of the battery switch circuit is coupled with one or more battery modules, and an output end of the battery switch circuit is coupled with the power supply bus; and the energy management module communicates with the battery switch circuit and is configured to control on-off functionality of the battery switch circuit.

15. The power supply device of claim 9, wherein the power supply circuit comprises a power supply bus, a photovoltaic switch circuit, a battery switch circuit and a charging start circuit;

wherein an input end of the photovoltaic switch circuit is coupled to a photovoltaic device, and an output end of the photovoltaic switch circuit is coupled with the power supply bus;

wherein an input end of the battery switch circuit is coupled with one or more battery modules, and an output end of the battery switch circuit is coupled with the power supply bus;

wherein an input end of the charging start circuit is coupled with a node between the photovoltaic switch circuit and the photovoltaic device, and an output end of the charging start circuit is coupled with a node between the battery switch circuit and the battery module; and the energy management module communicates with the photovoltaic switch circuit, the battery switch circuit and the charging start circuit, respectively, and is configured to, control the photovoltaic switch circuit and the battery switch circuit to be switched off, and control the charging start circuit to be switched on, so that the photovoltaic device charges one or more battery modules.

16. The power supply device of claim 9, wherein the power supply circuit comprises a power supply bus and a main switch circuit;

wherein an input end of the main switch circuit is coupled to a main electricity grid, and an output end of the main switch circuit is coupled with the power supply bus; and the energy management module communicates with the main switch circuit and is configured to control on-off functionality of the main switch circuit.

17. The power supply device of claim 9, wherein the power supply circuit comprises a power supply bus, a main switch circuit and a photovoltaic switch circuit;

wherein an input end of the main switch circuit is coupled to a main electricity grid, and an output end of the main switch circuit is coupled with the power supply bus; and wherein an input end of the photovoltaic switch circuit is coupled to a photovoltaic device, and an output end of the photovoltaic switch circuit is coupled with the power supply bus;

the energy management module communicates with the main switch circuit and the photovoltaic switch circuit, respectively, and is configured to control the main switch circuit and the photovoltaic switch circuit to be switched on, so that the photovoltaic device is able to feed back the electric energy to the main electricity grid.

18. The power supply device of claim 9, wherein the power supply circuit comprises a power supply bus, a main switch circuit, and a photovoltaic switch circuit;

wherein an input end of the main switch circuit is coupled to a main electricity grid, and an output end of the main switch circuit is coupled with the power supply bus;

wherein an input end of the photovoltaic switch circuit is coupled to a photovoltaic device, and an output end of the photovoltaic switch circuit is coupled with the power supply bus; and the energy management module communicates with the main switch circuit and the photovoltaic switch circuit, respectively, and is configured to detect the photovoltaic device and control the main switch circuit to be switched off and the photovoltaic switch circuit to be switched on if the power supply capacity of the photovoltaic device meets the power supply demand.

19. The power supply device of claim 9, wherein the power supply circuit comprises a power supply bus, a main switch circuit and a battery switch circuit;

wherein an input end of the main switch circuit is coupled to a main electricity grid, and an output end of the main switch circuit is coupled with the power supply bus;

wherein an input end of the battery switch circuit is coupled to with one or more battery modules, and an output end of the battery switch circuit is coupled with the power supply bus; and the energy management module communicates with the main switch circuit and the battery switch circuit, respectively, and is configured to detect the battery module and control the main switch circuit to be switched off and the battery switch circuit to be switched on if the power supply capacity of the battery module meets the power supply demand.

20. The power supply device of claim 9, wherein the power supply circuit comprises a power supply bus, a main switch circuit, a photovoltaic switch circuit and a battery switch circuit;

wherein an input end of the main switch circuit is coupled to a main electricity grid, and an output end of the main switch circuit is coupled with the power supply bus;

wherein an input end of the photovoltaic switch circuit is coupled to a photovoltaic device, and an output end of the photovoltaic switch circuit is coupled with the power supply bus;

wherein an input end of the battery switch circuit is coupled with one or more battery modules and an output end of the battery switch circuit is coupled with the power supply bus; and the energy management module communicates with the main switch circuit, the photovoltaic switch circuit and the battery switch circuit, respectively, and is configured to perform a detection on the photovoltaic device and the battery module and control the main switch circuit to be switched off, the photovoltaic switch circuit to be switched on, and the battery switch circuit to be switched on if the sum of power supply capacities of the photovoltaic device and the battery module meets the power supply demand.

21. The power supply device of claim 9, wherein the power supply circuit comprises a power supply bus and a generator switch circuit;

wherein an input end of the generator switch circuit is coupled to a generator and an output end of the generator switch circuit is coupled with the power supply bus; and the energy management module communicates with the generator switch circuit and is configured to control on-off functionality of the generator switch circuit.

22. The power supply device of claim 21, wherein the energy management module communicates with the generator and is configured to control start and stop of the generator.

23. The power supply device of claim 9, wherein the power supply circuit comprises a power supply bus, a generator switch circuit, and a battery switch circuit;

wherein an input end of the generator switch circuit is coupled to a generator, and an output end of the generator switch circuit is coupled with the power supply bus;

wherein an input end of the battery switch circuit is coupled with one or more battery modules and an output end of the battery switch circuit is coupled with the power supply bus; and the energy management module communicates with the generator switch circuit and the battery switch circuit, respectively, and is configured to control the generator switch circuit and the battery switch circuit to be switched on, so that the generator charges the battery module.

24. The power supply device of claim 9, wherein the power supply circuit comprises a power supply bus, a generator switch circuit, and a load switch circuit;

wherein an input end of the generator switch circuit is coupled to a generator, and an output end of the generator switch circuit is coupled with the power supply bus;

wherein an input end of the load switch circuit is coupled with the power supply bus, and an output end of the load switch circuit is coupled with a load; and the energy management module communicates with the generator switch circuit and the load switch circuit, respectively, and is configured to control the generator switch circuit and the load switch circuit to be switched on, so that the generator charges the load.

25. The power supply device of claim 9, wherein the power supply circuit comprises a power supply bus, a main switch circuit, a standby switch circuit, and a standby load branch;

wherein an input end of the main switch circuit is coupled to a main electricity grid, and an output end of the main switch circuit is coupled with the power supply bus;

wherein an input end of the standby switch circuit is coupled with a standby power supply, and an output end of the standby switch circuit is coupled with the power supply bus;

wherein an input end of the standby load branch is coupled with the power supply bus, and an output end of the standby load branch is coupled with a standby load; and the energy management module communicates with the main switch circuit, the standby switch circuit and the standby load branch, respectively, and is configured to control the main switch circuit to be switched off, the standby switch circuit and the standby load branch to be switched on, so that the standby power supply is able to supply power to the standby load.

26. The power supply device of claim 9, wherein the power supply circuit comprises a power supply bus, a main switch circuit, and a non-standby load branch;

wherein an input end of the main switch circuit is coupled to a main electricity grid, and an output end of the main switch circuit is coupled with the power supply bus;

wherein an input end of the non-standby load branch is coupled with the power supply bus, and an output end of the non-standby load branch is coupled with a non-standby load; and the energy management module communicates with the main switch circuit and the non-standby load branch, respectively, and is configured to control the non-standby load branch to be switched on if the main switch circuit is on; and control the non-standby load branch to be switched off if the main switch circuit is off.

27. The power supply device of claim 9, wherein the power supply circuit comprises a power supply bus and an electric vehicle charging circuit;

wherein an input end of the electric vehicle charging circuit is coupled with the power supply bus, and an output end of the electric vehicle charging circuit is coupled with an electric vehicle; and the energy management module communicates with the electric vehicle charging circuit and is configured to control on-off of the electric vehicle charging circuit.

28. The power supply device of claim 8, wherein the power supply device further comprises an intelligent load box;

wherein an input end of the intelligent load box is coupled with the distribution box, and an output end of the intelligent load box is coupled with a load and is configured to control power supply of the load.

29. A power supply system, comprising a distribution box, a power fusion system, and at least one battery module; wherein the distribution box is coupled with the power fusion system and the battery module;

the power fusion system comprises a control unit, at least one power conversion unit, and a DC/AC unit;

the power conversion unit is configured to convert current output by a power supply into DC;

the DC/AC unit is coupled with all installed power conversion units and is configured to convert DC output by one or more power conversion units into AC that meets power supply demand;

the control unit communicates with all installed power conversion units and the DC/AC unit, and is configured to control operation of one or more of the power conversion units and the DC/AC unit;

the distribution box is configured to determine power supply demand and allocate the power supply connected with the power fusion system according to the power supply demand; and the battery module supplies power to the load separately or jointly.

* * * * *